(12) United States Patent
Conner

(10) Patent No.: US 6,752,496 B2
(45) Date of Patent: Jun. 22, 2004

(54) PLASTIC FOLDING AND TELESCOPING EYEGLASS FRAMES

(75) Inventor: William A. Conner, San Diego, CA (US)

(73) Assignee: MicroVision Optical, Inc., San Diego, CA (US)

( * ) Notice: Subject to any disclaimer, the term of this patent is extended or adjusted under 35 U.S.C. 154(b) by 0 days.

(21) Appl. No.: 10/302,665

(22) Filed: Nov. 21, 2002

(65) Prior Publication Data

US 2004/0100615 A1 May 27, 2004

(51) Int. Cl.[7] .................................................. G02C 5/08
(52) U.S. Cl. ........................ 351/63; 351/118; 351/119
(58) Field of Search ........................... 351/63, 118, 119, 351/111, 41; 2/454

(56) References Cited

U.S. PATENT DOCUMENTS 1,936,319 A * 11/1933 Wingate ...................... 351/63
5,929,966 A * 7/1999 Conner ...................... 351/118

* cited by examiner

Primary Examiner—Hung X. Dang
(74) Attorney, Agent, or Firm—Rob L. Phillips; Quirk & Tratos

(57) ABSTRACT

The embodiments of the present invention provide new and unique plastic folding and telescoping eyeglass frames that provide the opportunity for producing a wide variety of colorful, lightweight and easy folding eyewear. Although the illustrated plastic folding and telescoping eyeglasses appear to be the fragile plastic styles of the past, they possess far greater flexibility and fracture resistance due to new cross-linked polymer plastics used in injection molding processes. The frames are easily adapted to the extreme curvature of some of the lenses of trendy eyeglass fashions and facilitated by the inclusion of a bi-folding bridge member. The plastic folding and telescoping eyeglasses also incorporate telescoping temples. An off-set bi-folding bridge member permits the lenses to fold over one another and the temples to rest next to one another providing a compact package for easy storage.

8 Claims, 3 Drawing Sheets

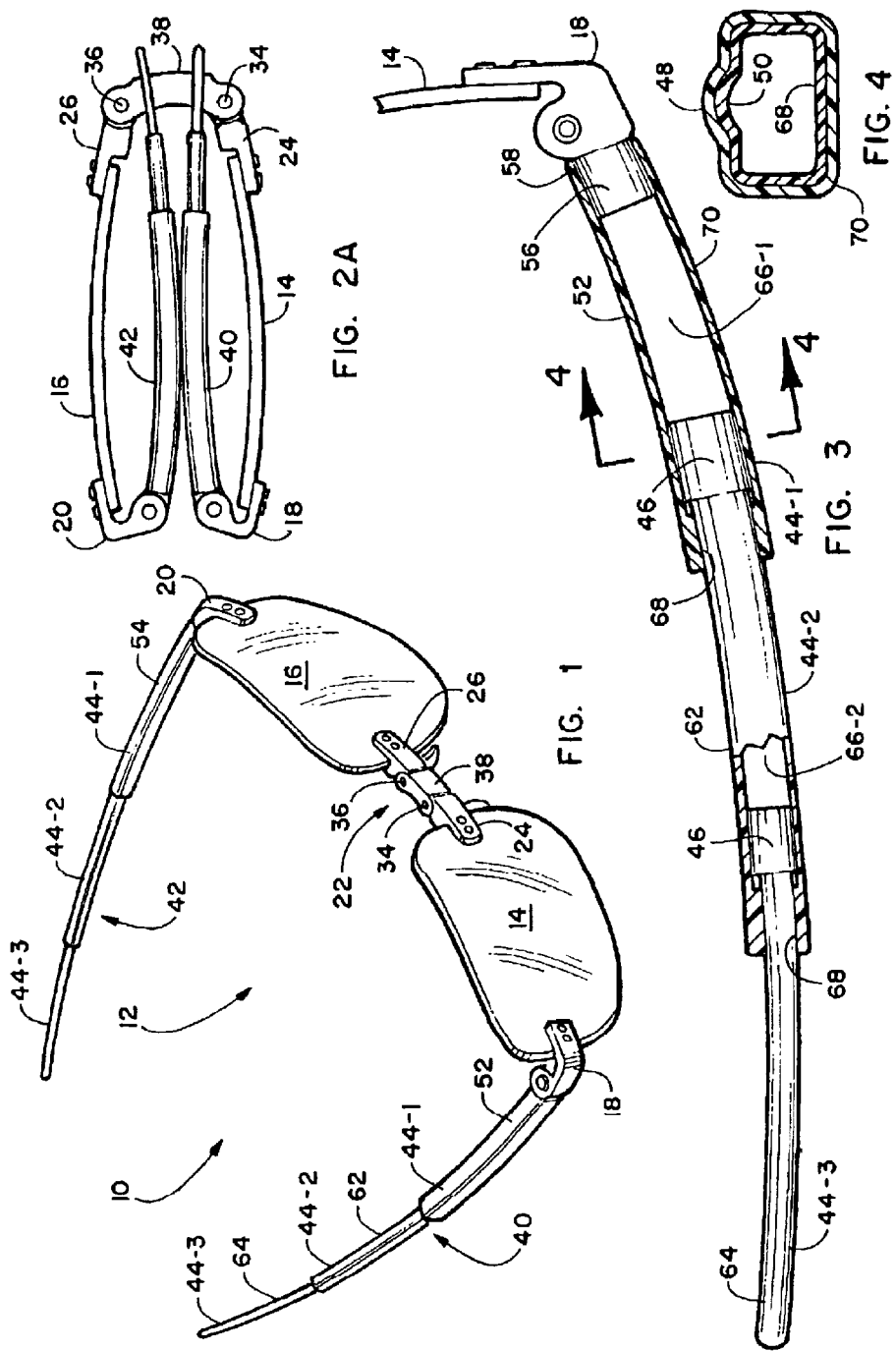

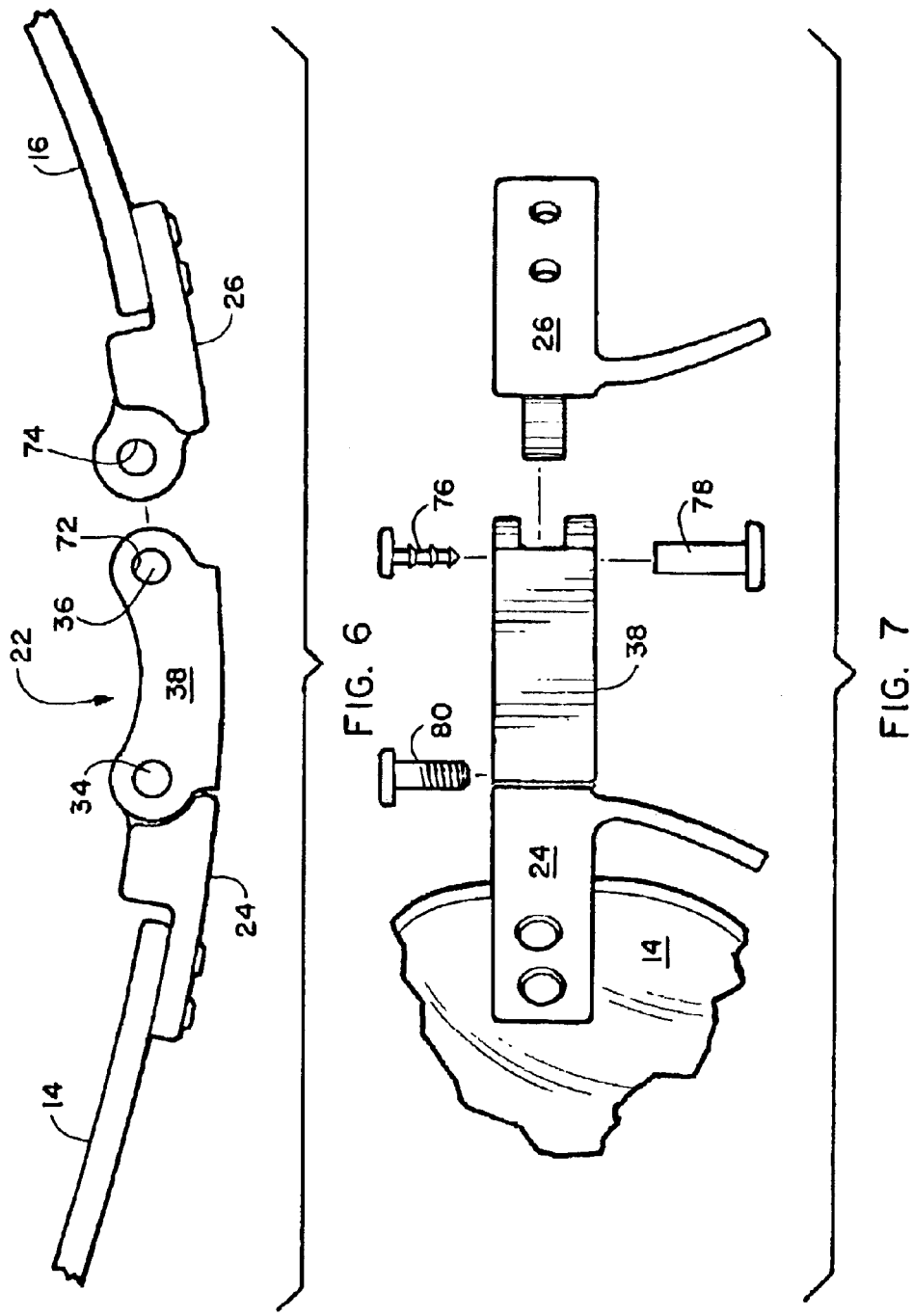

PLASTIC FOLDING AND TELESCOPING EYEGLASS FRAMES

FIELD OF THE INVENTION

The embodiments of the present invention relate to eyeglasses. More particularly, the embodiments of the present invention relate to eyeglasses of the folding and telescoping variety.

BACKGROUND OF THE INVENTION

The trend in the eyeglass industry is to make eyeglasses smaller, lighter and more compact. Additionally, manufacturers desire a reduction in the manufacturing costs, while continuing to produce improved and more desirable products. As such, manufacturers have turned to injection molded parts which cost far less to mass produce than similar metal parts. Unfortunately, plastic parts have been more fragile, cumbersome and subject to breakage than their metal counter-parts.

However, with the advent of the new cross-linked polymers, plastic parts have become much more advantageous in the eyeglass industry. Cross-linked polymer plastics can be manufactured with thinner cross sections, while increasing the associated fracture resistance, than that of the previous injection molded plastic parts. In addition, the plastic parts may be manufactured in a wide variety of vivid colors.

The embodiments of the present invention describe a new and unique compact style of plastic folding and telescoping eyeglass frames for both rimmed and rimless style eyeglasses. A bi-folding bridge member adds flexibility to the eyeglasses and provides an easy and simple folding method. Conventionally, folding eyeglasses have been fabricated of metal to withstand stresses experienced when the eyeglasses are in an extended and usable state. In the past, plastic was avoided because of its brittle nature and to achieve the foldability. Therefore, the plastic thickness was increased to a point that the eyeglasses were unattractive. The emergence of new and advanced plastics have increased strength and resistance to fracture thereby facilitating the unique telescoping temple member and bi-folding bridge of the embodiments of the present invention.

SUMMARY OF THE INVENTION

The embodiments of the present invention relate to a unique style of plastic folding and telescoping eyeglass frames for both rimmed and rimless eyeglass styles. The eyeglass frames of the embodiments of the present invention have a bi-folding bridge that allows them to be folded into a compressed state. The folding feature is achieved by misaligning pivot points on a central link of the bi-folding bridge so that the compressed temple members are offset in a vertical plane when folded thereby facilitating an optimum folded eyeglass thickness. The bi-folding bridge member is particularly effective with eyeglasses having excessively curved lenses which do not fold flat when equipped with only a single hinge bridge member. Moreover, metal folding eyeglasses fold into a more compressed state since their components are much thinner with a more rigid frame work while the previous plastic frames required a thicker cross section. Thus it has been found that a second hinge member is desirable to optimize the thickness of the plastic folded frames and lenses.

The embodiments of the present invention also incorporate temples that telescope for length adjustment and storage. The temple sections are comprised of two or more interconnected sections having expanded ends and mating keys that translate the length of each section. A first temple section joins a temple hinge unit by means of a reduced end that engages a temple unit protrusion. The temple hinge unit may mount directly to the eyeglass lenses for the rimless styles or may be incorporated into lenses for conventional rims that encompass the lenses of the eyeglasses. Each a right and left eyeglasses temple member assembly has an opposing curvature that retains the eyeglasses on a person's head.

Each temple member assembly is comprised of at least two interconnected telescoping sections. Each temple section maintains the curvature of its corresponding completed right or left temple member assembly. A first end of a front right and front left temple section is permanently attached to the temple hinge unit while each succeeding temple section has an expanded end that conforms to the shape of a central chamber of a preceding temple section with a slight interconnected fit. The expanded end of each temple section is interconnected within each preceding temple section by a thickened end wall. The thickened end wall, along with a thinner wall of each temple section, maintains a mating key that allows the temple sections to slide laterally while preventing any section rotation. The keyed configuration sections may be rounded, squared, or any other shape that mates within itself. The rear temple section of each temple member assembly is solid without any central chamber thereby adding to the rigidity of the smaller diameter temple section while maintaining the curvature of the completed temple member assembly.

While the objects of the embodiments of the present invention are numerous, several are listed herein for reference.

A first object of the embodiments of the present invention is to create a pair of eyeglasses with plastic frames that fold into an area as small as possible. Another object of the embodiments of the present invention is to fold eyeglasses with curved lenses in as small an area as possible by incorporating two hinge units in a bridge member.

Another object of the embodiments of the present invention is to create a pair of folding eyeglasses that fold easily and in a simple and understandable fashion. Another object of the embodiments of the present invention is to create a pair of eyeglasses with plastic frames wherein the temples, comprised of two or more interconnected sections, interact laterally for length adjustment and storage. Another object of the embodiments of the present invention is to create a pair of eyeglasses with translatable temple sections that are equipped with unique anti-rotation mating keys.

These together with other objects and advantages which will become subsequently apparent and reside in the details of the construction and operation as more fully hereinafter described and claimed, reference being had to accompanying drawings forming a part hereof, wherein like numerals refer to like parts throughout.

BRIEF DESCRIPTION OF THE DRAWINGS

FIG. 1 depicts a perspective view of a plastic folding rimless eyeglass frame with a bi-folding bridge member in an extended position;

FIG. 2A depicts an upper view of a first configuration of folding eyeglasses with a bi-folding bridge member in a folded state and temple members abutting each other;

FIG. 3 depicts a partially transparent view of a right temple member assembly to clarify the interlocking capabilities of each temple section;

FIG. 4 is a sectional view of one of the temple member assemblies indicating the common anti-rotation mating keys;

FIG. 6 is a top view of the bi-folding bridge member with one side exploded to depict the hinge components; and FIG. 7 is a front view of the bi-folding bridge member with one side and the hinge pin exploded to depict the hinge components.

DETAILED DESCRIPTION OF THE PREFERRED EMBODIMENT

Figure 2B:
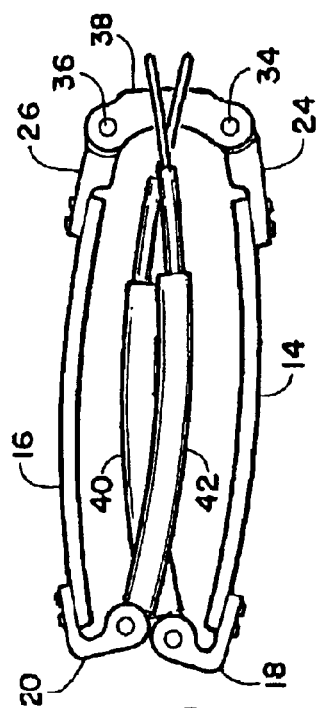
FIG. 2B depicts an upper view of a second configuration folding eyeglasses with the bi-folding bridge member in the folded state and the temple members overlapped.
Figure 5:
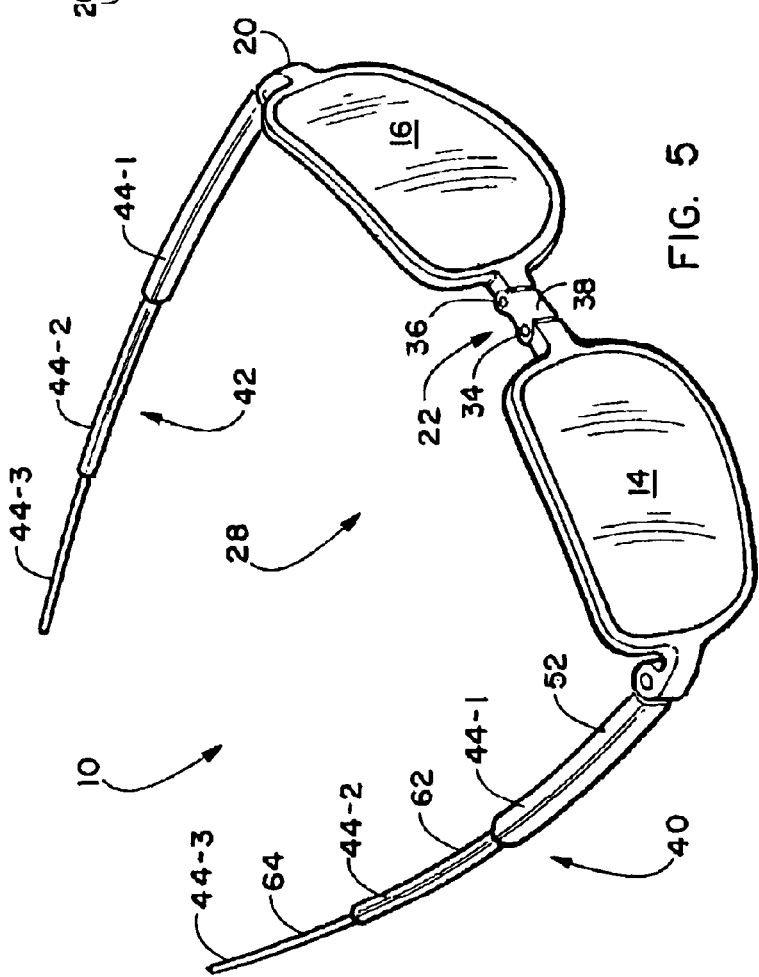
FIG. 5 depicts a perspective view of the folding eyeglasses with conventional rims enclosing the lenses.

The embodiments of the present invention relate to a unique style of plastic folding and telescoping eyeglass frames 10. FIG. 1 shows a rimless style frame 12. attached to lenses 14, 16 by means of hinged temple members 18, 20 which are attached to outer edges of the lenses 14, 16. A bi-folding bridge 22 is attached to inner edges by means of hinge members 24. 26. A conventional style of eyeglass frames 28 with rims 30, 32 encompassing the lenses 14, 16 is illustrated in FIG. 5. The bi-folding bridge 22 allows them to be folded into a optimum compressed state. The optimum state is achieved by off-setting vertically the pivot points 34, 36 on a bridge central link 38 of the bi-folding bridge 22 so that a compressed right temple member assembly 40 and a compressed left temple member assembly 42 are not aligned when folded, but rest next to each other when the eyeglasses come together as depicted in FIG. 2B. FIG. 2A illustrates an embodiment where the pivot points 34, 36 are not offset.

Both the unique rimless eyeglass frames 12 and the conventional eyeglass frames 28 also incorporate the unique right temple member assembly 40 and the left temple member assembly 42 that telescope for length adjustment and storage. The temple member assemblies 40, 42 are comprised of two or more sliding sections 44-1 through 44-3 with expanded temple ends 46 and mating keys 48, 50 that translate the length of one or more of the sliding section 44-1 through 44-3. First temple sections 44-1 join to the temple hinge units 18, 20 by means of a temple end 56 that is glued within the ends 58 of the right and left temple member assemblies. The temple hinge units 18, 20 may mount directly to the eyeglass lenses 14, 16 as with the rimless eyeglasses 12 or may be incorporated into the rims 30, 32 as with conventional eyeglasses frames 28. The right temple member assembly 40 and left temple member assembly 42 each incorporate an opposing curvature that operate to hold the eyeglasses on a person's head.

FIG. 3 illustrates the right temple member assembly 40 depicting each temple section 44-1 through 44-3 which each maintain the curvature of the completed right temple member assembly 40. The first temple section 44-1 is permanently attached to the temple hinge unit 18 while each succeeding temple member 44-2, 44-3 have expanded ends 46 that conform to the shape of a central chamber 66-1, 66-2 of the preceding temple members 44-1, 44-2. The expanded temple end 46 of each temple section 44-2, 44-3 is restrained within each preceding temple member 44-1, 44-2 by a thickened end wall 68. The thickened end wall 68, along with the thinner wall 70 of each temple section 44-1, 44-2 incorporates mating keys 48, 50 that allow the temple sections 44-2, 44-3 to slide laterally while preventing any rotation. This keyed configuration may be a rounded, squared, or any other rotation limiting shape that mates within itself. Moreover, the mating keys 48, 50 may be located on any inner portion of the temple sections 44-1, 44-2 and translate the entire length of each temple section 44-1, 44-2 to prevent rotation of the temple sections 44-2, 44-3 within the other. The temple section 44-3 of the temple member assembly 40 does not include a central chamber thereby adding to the rigidity of the temple section 44-3 that has a smaller diameter than the other temple sections 44-1, 44-2.

Cross-sectional views of the temple section 44-1 and mating keys 48, 50 are shown in FIG. 4. Although illustrated with a rectangular temple section 44-1 and rounded mating keys 48, 50, it is understood that the shape of the temple sections 44-1 through 44-3 and the mating keys 48, 50 may be round, square or any other geometric shape to limit rotation of the temple sections 44-1 through 44-3.

FIG. 6 depicts an upper exploded views of the bi-folding bridge 22 with the right bridge hinge member 24 attached to both the lens 14 and the bridge central link 38 at a hinge point 34. A left bridge hinge member 26 is normally attached to central link 38 but is shown exploded away thereby revealing the bridge pivoting orifices 72 in the bridge central link 38 of the bi-folding bridge 22 and the pivot orifice 74 in the left bridge hinge member 26 of the bi-folding bridge 22 making up the hinge point 36. FIG. 7 is a front exploded view of the bi-folding bridge 22 with the right bridge hinge member 24 attached to both the lens 14 and the bridge central link 38. The left bridge hinge member 26 is exploded away to show a barbed pin 76 and nylon bushing 7 and an alternative threaded screw 80. Either attachment and pivoting means may be used for the bi-folding bridge 22 and the temple hinge units 18, 20.

It is to be understood, however, that even though numerous characteristics of trier present invention have been set forth in the foregoing description, together with an explanation of various possible embodiments and modifications thereto, this disclosure is illustrative only and changes may be made within the spirit of the invention to the full extent indicated by the broad general meaning of the terms in which the appended claims are expressed.

I claim:

1. A pair of rimless folding eyeglasses comprising:
   a bridge member including a central unit joining a right and left pivot member;
   said right and left pivot member each attached directly to an inner portion of a right and left lens respectively; and
   a right and left temple each having two or more telescoping temple sections, said right and left temple member each rotatably attached to a temple hinge, said temple hinge associated with the right and left temple member attached to an outer-portion of the right and left lens respectively.

2. The folding eyeglasses of claim 1 wherein said eyeglasses are fabricated of cross-linked polymer plastic.

3. The folding eyeglasses of claim 1 wherein the right and left pivot members are vertically offset thereby facilitating folding of the eyeglasses.

4. The folding eyeglasses of claim 1 wherein the temple members comprise three translatable temple sections.

5. The folding eyeglasses of claim 1 wherein a first translatable temple section attached at a first end to the temple hinge includes an inner channel for translatable receipt of a second temple section.

6. The folding eyeglasses of claim 5 wherein said second temple section includes an enlarged first end restrained in the inner channel of the first temple section by a reduced channel diameter adjacent a second end thereof.

7. Folding eyeglasses comprising:

a bridge member having a central unit and two outer pivot members;

said outer pivot members each attached directly to an inner portion of opposite eyeglass lenses; and two temple members each having two or more telescoping temple sections, said temple members each rotatably attached to a temple hinge, each said temple hinge attached to an outer portion of a different one of the opposite eyeglass lenses.

8. Folding eyeglass comprising:

a bridge member having a central unit and two outer pivot members;

said outer pivot members vertically offset and each attached directly to an inner portion of opposite eyeglass lenses; and two temple members each having two or more telescoping temple sections, said temple members each rotatably attached to a temple hinge, each said temple hinge attached to an outer portion of a different one of the opposite eyeglass lenses.

* * * * *

UNITED STATES PATENT AND TRADEMARK OFFICE
CERTIFICATE OF CORRECTION

PATENT NO.   : 6,752,496 B2
DATED        : June 22, 2004
INVENTOR(S)  : William A. Conner It is certified that error appears in the above-identified patent and that said Letters Patent is hereby corrected as shown below:

Column 4,
Line 55, "outer-portion" to -- outer portion --.

Signed and Sealed this

Thirtieth Day of November, 2004

JON W. DUDAS
*Director of the United States Patent and Trademark Office*